United States Patent [19]

Suzuki et al.

[11] Patent Number: 4,461,753

[45] Date of Patent: Jul. 24, 1984

[54] PROCESS FOR PRODUCING PHOTOCONDUCTIVE CADMIUM SULFIDE

[75] Inventors: Kiyoshi Suzuki, Yokohama; Fumio Sumino, Kawasaki, both of Japan

[73] Assignee: Canon Kabushiki Kaisha, Tokyo, Japan

[21] Appl. No.: 364,606

[22] Filed: Apr. 1, 1982

[30] Foreign Application Priority Data

Apr. 15, 1981 [JP] Japan ................................ 56-56573
Apr. 15, 1981 [JP] Japan ................................ 56-56574

[51] Int. Cl.$^3$ .................... B01J 13/00; C01B 19/00; G03G 5/04
[52] U.S. Cl. .................... 423/561 B; 252/301.6 S; 252/501.1; 430/94
[58] Field of Search ............. 423/561 B; 252/301.6 S, 252/501.1; 430/94

[56] References Cited

U.S. PATENT DOCUMENTS

| | | | |
|---|---|---|---|
| 3,058,807 | 10/1962 | Holland | 252/301.6 S |
| 3,573,905 | 4/1971 | Makiwo et al. | 423/561 B |
| 3,592,643 | 7/1971 | Bartfai | 430/94 |
| 3,948,656 | 4/1976 | Maxwell | 423/561 B |
| 4,021,237 | 5/1977 | Kawashima et al. | 423/561 B |
| 4,316,947 | 2/1982 | Suzuki et al. | 252/501.1 |

FOREIGN PATENT DOCUMENTS 1467316  1/1969  Fed. Rep. of Germany ... 423/561 B

*Primary Examiner*—Gary P. Straub
*Attorney, Agent, or Firm*—Fitzpatrick, Cella, Harper & Scinto

[57] ABSTRACT

A process for producing photoconductive cadmium sulfide by introducing hydrogen sulfide into an aqueous solution containing cadmium ion comprizes, after completion of the first reaction of the cadmium ion with the hydrogen sulfide, repeating the reaction operation of adding further cadmium ion to the reaction mixture to cause the additional cadmium ion to react with the hydrogen sulfide.

3 Claims, No Drawings

PROCESS FOR PRODUCING PHOTOCONDUCTIVE CADMIUM SULFIDE

BACKGROUND OF THE INVENTION

1. Field of the Invention

This invention relates to a process for producing photoconductive cadmium sulfide particles. More particularly, it relates to a process for producing cadmium sulfide particles having fine particle size and good sensitivity, with little agglomeration of the particles, by carrying out the first reaction of cadmium ion in an aqueous solution with hydrogen sulfide and then repeating the reaction operation of adding cadmium ion to the reaction mixture to cause the cadmium ion to react with hydrogen sulfide.

2. Description of the Prior Art

Photoconductive cadmium sulfide has so far been produced by passing hydrogen sulfide gas into a solution containing a water-soluble cadmium salt such as cadmium sulfate to form a cadmium sulfide precipitate. The cadmium sulfide produced in this way contains neither donor type nor acceptor type of impurity. In order to use this cadmium sulfide as raw material particles for an electrophotographic photoconductive material, it is necessary to fire it at a high temperature after addition of $CuCl_2$ or the like as an activator and a halide compound such as $CdCl_2$ or $ZnCl_2$ as a flux. Cadmium sulfide is then activated by the diffusion of these impurities into the cadmium sulfide particles during the heat treatment. The cadmium sulfide thus activated is used as an electrophotographic photoconductive material.

In another conventional method of preparing raw particles of cadmium sulfide, as described in U.S. Pat. No. 4,021,237, hydrogen sulfide gas is caused to react with a solution containing cadmium ion and certain impurity element ion to produce cadmium sulfide particles containing an impurity. Since the raw particles thus prepared already contain a desirable impurity, the diffusion of the impurity into the particles occurs during the subsequent firing step even if a flux or the like is not added, and as a result, activated cadmium sulfide for electrophotography is obtained. In particular, in this method, the diffusion of impurity proceeds efficiently during the firing step because of previous incorporation of impurity in the cadmium sulfide, and excessive growth of cadmium sulfide particles does not take place since no flux is used.

However, the cadmium sulfide produced by these methods has still disadvantages in the following respects: Crystalline nuclei produced in the initial stage of the above reaction gather together as the reaction proceeds, and as a result, relatively large particles of higher order such as secondary particles are inadvantageously formed which contain two- or three-dimensional agglomerates of the primary particles.

When cadmium sulfide containing such agglomerates is dispersed in a binder resin and then coated on a substrate, minute unevenness is formed on the coating surface. A photosensitive member having such a coating surface is unsatisfactory when more improved images than those conventionally formed are aimed at. It is therefore necessary to minimize the two- or three-dimensional agglomeration of the particles as far as possible.

It has been so far expected that the reduced particle size of cadmium sulfide more improves the quality of its coating surface and permits more uniform arrangement of the particles on the surface of photosensitive member and further reduces the voids among the particles, thereby resulting in also a marked improvement in the resolving power of photosensitive member.

However, even when the particle size of cadmium sulfide is actually reduced by selecting appropriate reaction conditions, the two- or three-dimensional agglomerates of the particles are still produced. In the subsequent drying step, the cadmium sulfide particles become one solid mass as a whole which cannot be divided finely by a usual size reduction means except for mechanical means. When the reaction is carried out in a solution containing lower concentration of cadmium ion, cadmium sulfide particles are obtained which form two- or three-dimensional agglomerates thereof to a lesser extent. In this case, however, the production output decreases in consequence of low concentration of cadmium ion.

SUMMARY OF THE INVENTION

It is the primary object of this invention to provide a process for producing cadmium sulfide which is of extremely fine particle size and the primary particles of which do not form the secondary particles or particles of higher order by agglomeration.

It is another object of the invention to provide a process for producing cadmium sulfide of fine particle size with high efficiency.

It is a further object of the invention to provide cadmium sulfide having fine particle sizes and not forming agglomerates of particles even after the firing step.

According to the present invention, there is provided a process for producing photoconductive cadmium sulfide by introducing hydrogen sulfide into an aqueous solution containing cadmium ion which comprises, after completion of the first reaction of the cadmium ion with the hydrogen sulfide, repeating the reaction operation of adding further cadmium ion to the reaction mixture to cause the additional cadmium ion to react with the hydrogen sulfide.

DETAILED DESCRIPTION OF THE PREFERRED EMBODIMENT

This invention utilizes the fact that the particles of cadmium sulfide produced by the reaction of cadmium ion in water with hydrogen sulfide are largely influenced by the state of their crystal nuclei formed at the initial stage of reaction and produces fine particles of cadmium sulfide which do not form the two- or three-dimensional agglomerates, with high efficiency and in a large quantity in one batch by carrying out the reaction operation two or more times, in particular 3 to 5 times, to lower the cadmium ion concentration at the initial stage of reaction.

The sensitivity of the cadmium sulfide particles formed according to the invention has been found to depend upon the minute difference in size between the particles. The particle size of cadmium sulfide is desirable to be in the range of $0.1-0.5\mu$. If the particle size is below $0.1\mu$, the sensitivity decreases on account of increase in the number of barriers formed between particles, and on the other hand, if above $0.5\mu$, the resistance of the particle lowers so that the degree of enhancing the resistance attributable to addition of an acceptor type of impurity becomes lower.

Thus, cadmium sulfide particles which have sizes ranging from 0.1 to $0.5\mu$ and do not aggregate mutually exhibit good sensitivity and are easy to enhance the resistance. Moreover, when such cadmium sulfide particles are dispersed in a binder resin and coated on a substrate, a smooth coating surface is obtained, and improvement in the quality of the obtained images can be achieved. The particle size is more preferably 0.2 to 0.4μ.

An impurity which is called acceptor or donor may be incorporated into the cadmium sulfide particles if necessary. The amount of acceptor impurity needs to be controlled depending upon the particle size of cadmium sulfide. The larger the amount of acceptor, the better in case of large particle size.

The two- or three-dimensional agglomeration of cadmium sulfide particles is better prevented, as mentioned above, by lowering the concentration of the cadmium ion in the solution of a water-soluble cadmium salt such as cadmium sulfate, cadmium chloride, or cadmium nitrate, as far as possible. However, for the purpose of obtaining cadmium sulfide with little agglomeration of the primary particles without reduction in the output of cadmium sulfide, it is necessary to repeat the reaction operation after completion of the first reaction. The number of the reaction is desirably 5 or less since increasing the number of the reaction results in disadvantages in terms of productivity and labor.

The amount of cadmium used needs controlling to a low value for the first stage of the reaction; however, for the second and later reactions, gradual increase in the amount raises no problem in respect to the agglomeration of the primary particles, that is, the formation of higher order particles. Consequently, the amount of cadmium sulfide finally obtained can be made considerably large. The suitable initial concentration of cadmium ion is in the extent of about 0.01 to 0.15 mole/l.

Generally, it is preferable to add sulfuric acid to the aqueous solution containing cadmium ion for the purpose of controlling the particle size of the resulting cadmium sulfide. The concentration of sulfuric acid in the aqueous solution is desirably 0 to 0.2N for the first reaction; and for the final stage of reaction it is desirably 1.0 to 1.5N and 0.8 to 1.2N when the reaction operation is repeated 3 times and 5 times, respectively.

The hydrogen sulfide to be fed to an aqueous solution containing cadmium ion is introduced, for example, in continuous manner during each reaction.

This invention will be further illustrated by the following examples.

EXAMPLE 1

Hydrogen sulfide was passed into 2.0 liters of an aqueous solution containing 0.2 mole of cadmium sulfate, for 12 minutes at a rate of 0.4 l/min while the solution was kept at 60° C. After completion of the reaction, 0.48 mole of cadmium sulfate and sulfuric acid were added to the resulting mixture to give a sulfuric acid concentration of 0.7N and a total liquid volume of 2.4 l.

Hydrogen sulfide was again passed thereinto for 27 minutes at a rate of 0.4 l/min while the liquid temperature was kept at 60° C., to complete the reaction. Then, 0.82 mole of cadmium sulfate and sulfuric acid were further added to the resulting mixture to give a sulfuric acid concentration of 1.5N and a total liquid volume of 3.0 l. Hydrogen sulfide was passed thereinto for 45 minutes at a rate of 0.4 l/min while the liquid temperature was kept at 60° C., to the complete reaction. The cadmium sulfide formed in the repeated reaction operations was washed with pure water by the decantation to remove impurities present in excess on the surface of cadmium sulfide particles, and dried at 100° C. overnight. The powder after dried was 0.3μ in the average particle size and, unlike the particles of the prior art, contained no large agglomerating particle. Copper in the form of $CuCl_2$ as acceptor was added to the powder in an amount ratio of $8 \times 10^{-4}$ mole/mole of cadmium sulfide, and the powder was heated in the air for 120 minutes at 450° C. Thereafter, it was washed with pure water until the specific conductivity of washings became 1 μs/cm. The powder was dried at 70° C. overnight so that the desired cadmium sulfide was made up. The cadmium sulfide particles were uniform in size, had an average size of 0.3μ and contained no agglomerate of the particles.

Using a vinyl chloride-vinyl acetate copolymer as a binder, this cadmium sulfide was coated on a cylindrical drum to a thickness of 40μ by the dipping method to form a photosensitive layer. Further, an insulating resin was coated thereupon by the same method to a thickness of 30μ to prepare a photosensitive member. Image formation tests actually made on the photosensitive member gave sharp images with good resolution. Moreover, the photosensitive member had a smooth surface and exhibited a good stability to environment, that is, decrease in the image density was little even under high humidity conditions.

For comparison, cadmium sulfide prepared by passing hydrogen sulfide into 3 l of a solution containing 1.5 moles of cadmium sulfate produced agglomerate of the particles although the particle size was reduced, and as a result a desired photosensitive layer could not be formed.

EXAMPLE 2

While 1.4 l of an aqueous solution containing 0.07 mole of cadmium sulfate and $8 \times 10^{-4}$ mole of cupric sulfate was kept at a temperature of 65° C., hydrogen sulfide was passed thereinto at a rate of 0.2 l/min for 8 minutes to complete reaction. Then, 1.43 moles of cadmium sulfate and sulfuric acid were added to the resulting mixture to give a sulfuric acid concentration of 2.0N and a total liquid volume of 3.0 l. Hydrogen sulfide was passed thereinto at the same rate for 81 minutes while the liquid temperature was kept at 65° C. The cadmium sulfide formed in this operation was washed with pure water by decantation to remove impurities present in excess on the surface of cadmium sulfide particles, and dried at 100° C. overnight. The powder dried was 0.5μ in the average particle size and, unlike the particle of the prior art, contained no large particle agglomerate.

The powder was heated in the air for 60 minutes at 450° C. Then, it was washed with pure water until the specific conductivity of washings became 1 μs/cm. The powder was dried at 70° C. overnight so that the desired cadmium sulfide was prepared.

A photosensitive member was prepared by using the cadmium sulfide in the same manner as in Example 1. As a result, it had a smooth surface and gave sharp images with good resolution, similarly to Example 1.

EXAMPLE 3

While 1.4 l of an aqueous solution containing 0.03 mole of cadmium sulfate was kept at a temperature of 50° C., hydrogen sulfide was passed thereinto for 2 minutes at a rate of 0.4 l/min. Then, 0.15 mole of cadmium sulfate and sulfuric acid were added to the resulting reaction mixture to give a sulfuric acid concentration of 0.4N and a total liquid volume of 1.8 l. Hydrogen sulfide was further passed thereinto for 9 minutes at a rate of 0.4 l/min while the temperature was kept at 50° C. Thereafter, similar operations were repeated further three times, wherein the reaction conditions were as follows:

| Step | Amount of $CdSO_4$ added (mole) | Total liquid volume (l) | Conc. of $H_2SO_4$ (N) | Reaction period (min) | Flow rate of $H_2S$ (l/min) |
| --- | --- | --- | --- | --- | --- |
| 3 | 0.255 | 2.2 | 0.8 | 15 | 0.4 |
| 4 | 0.420 | 2.6 | 1.2 | 24 | 0.4 |
| 5 | 0.645 | 3.0 | 1.5 | 37 | 0.4 |

The cadmium sulfide thus formed was washed with pure water by the decantation to remove impurities present in excess on the surface of cadmium sulfide particles, and dried at 100° C. overnight. The powder dried was $0.2\mu$ in the average particle size and, unlike the particle of the prior art, contained no larger particle agglomerate. Copper was added to the powder in an amount ratio of $8 \times 10^{-4}$ mole/mole of cadmium sulfide, and then the powder was heated in the air for 60 minutes at 450° C. Thereafter, it was washed with pure water until the specific conductivity of washings became 1 μs/cm. The powder was dried at 70° C. overnight so that the desired cadmium sulfide was prepared.

A photosensitive member was prepared by using this cadmium sulfide in the same manner as Example 1. As a result, it had a smooth surface and gave sharp images with good resolution, similarly to Example 1.

What we claim is:

1. Process for producing photoconductive cadmium sulfide comprising:
   (a) introducing hydrogen sulfide into an aqueous solution containing from about 0.01 to 0.15 mole/l of cadmium ion and from about 0 to 0.2N of sulfuric acid to produce a cadmium sulfide reaction mixture;
   (b) adding additional cadmium ion and sulfuric acid to said reaction mixture in concentrations higher than that of step (a); and
   (c) introducing additional hydrogen sulfide into said reaction mixture to thereby form cadmium sulfide of a desired particle size.

2. The process of claim 1 including repeating steps (b) and (c) at least once.

3. The process of claim 1 including the steps of purifying the cadmium sulfide particles, drying the purified particles, doping said particles with an acceptor impurity, treating the particles to provide a desired conductivity and thereafter, recovering photoconductive cadmium sulfide particles having an average particle size from about 0.1 to 0.5 microns.

* * * * *